United States Patent [19]
Adamson et al.

[11] Patent Number: 5,010,729
[45] Date of Patent: Apr. 30, 1991

[54] GEARED COUNTERROTATING TURBINE/FAN PROPULSION SYSTEM

[75] Inventors: Arthur P. Adamson; Lawrence Butler, both of Cincinnati; Robert A. Wall, Wyoming, all of Ohio

[73] Assignee: General Electric Company, Cincinnati, Ohio

[21] Appl. No.: 292,802

[22] Filed: Jan. 3, 1989

[51] Int. Cl.$^5$ ............................................. F02K 3/72
[52] U.S. Cl. ............................... 60/226.1; 60/39.162; 60/268; 416/129
[58] Field of Search ................. 60/226.1, 39.162, 268; 415/65, 66, 68, 69; 416/129, 128, 171, 170 R; 74/DIG. 5

[56] References Cited

U.S. PATENT DOCUMENTS

| | | | |
|---|---|---|---|
| 3,673,802 | 7/1972 | Krebs et al. | 60/39.162 |
| 3,729,957 | 5/1973 | Petrie et al. | 60/39.162 |
| 4,005,575 | 2/1977 | Scott et al. | 60/268 |
| 4,159,624 | 7/1979 | Gruner | 60/39.162 |
| 4,251,987 | 2/1981 | Adamson . | |
| 4,540,369 | 9/1985 | Caires | 416/170 R |
| 4,751,816 | 6/1988 | Perry | 60/226.1 |

FOREIGN PATENT DOCUMENTS

| | | | |
|---|---|---|---|
| 2129502 | 5/1984 | United Kingdom | 416/129 |
| 2194593 | 3/1988 | United Kingdom | 60/268 |
| 2199375 | 7/1988 | United Kingdom | 60/39.162 |

Primary Examiner—Louis J. Casaregola
Assistant Examiner—Timothy S. Thorpe
Attorney, Agent, or Firm—Jerome C. Squillaro

[57] ABSTRACT

High by-pass fan jet engine includes counterrotating turbine blade sets for receiving hot combustion gases from a core engine portion and driving the fan blades through a planetary gear-type reduction gear assembly. Lightweight, highspeed, concentric, counterrotating shafts transmit power from both turbine blade sets to the fan via the reduction gear assembly. A pair of planetary gear assemblies with fixed ring gears and a rotatable common planetary gear carrier is used to drive a single set of fan blades via the carrier, and a pair of planetary gear assemblies with a fixed common planetary gear carrier and rotatable ring gears is used to drive two or more counterrotating fan blade sets via the ring gears. A low pressure "booster" compressor feeding the core engine portion can be directly driven from one of the two high speed shafts.

9 Claims, 3 Drawing Sheets

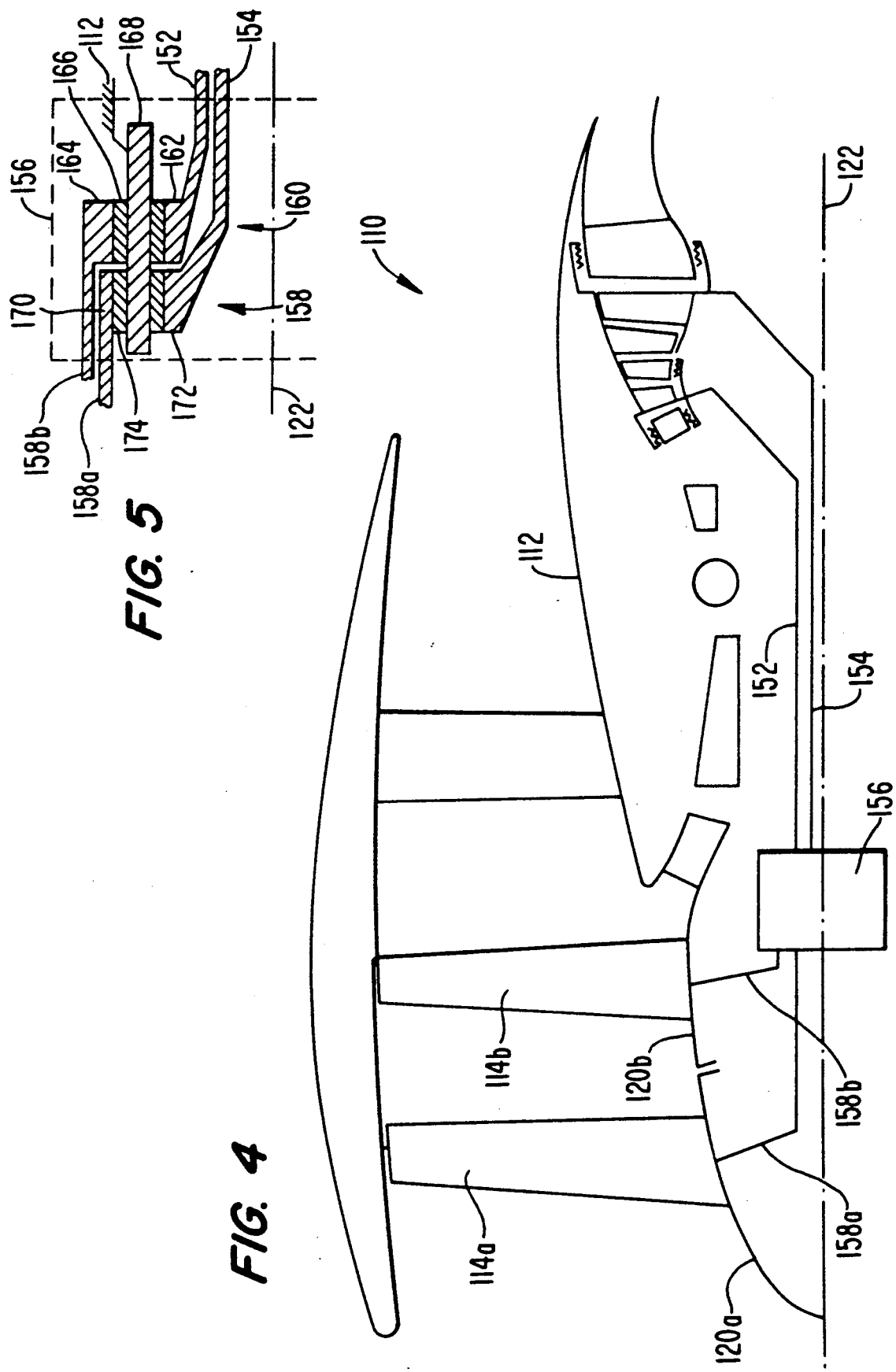

GEARED COUNTERROTATING TURBINE/FAN PROPULSION SYSTEM

BACKGROUND OF THE INVENTION

1. Field of the Invention

The present invention relates to fan jet engines of the type having a high by-pass ratio provided by one or more sets of fan blades extending outside the core engine housing and powered by one or more turbines receiving combustion gas generated by the core engine.

2. Description of the Prior Art

High by-pass engines, i.e., engines having a by-pass ratio greater than about 6, become somewhat cumbersome in two ways. With a direct drive from the power turbine to the fan, the turbine diameter and number of turbine stages both increase, and the resulting weight and cost are not attractive. Also, the low pressure compressor or "booster" positioned between the fan blades and the high-pressure compressor requires more axial stages and icing tendencies become excessive.

A typical solution to these problems is to provide a main reduction gear between the fan and the booster so that the power turbine and the booster can run at a high rpm speed while the fan runs at a low rpm speed. This provides a partial solution to the problem in that the power turbine spins faster but still not as fast as desired due to the large annular area on the output stage resulting in high stresses in the last stage rotor.

Counterrotating turbines previously have been proposed for direct drive (i.e. without reduction gears) of counterrotating fans in high by-pass engines as a means of matching fan and turbine speed requirements. Exploitation of this principle has been limited, however, by the torque capacity of the low speed shaft passing through the center of the core engine.

SUMMARY OF THE INVENTION

Hence, an object of the present invention is to provide further improvements in the design and construction of high by-pass fan jet engines of the ducted and unducted type.

Specifically, it is an object of the present invention to utilize the counterrotating turbine concept to economically and efficiently drive the fan blades in order to take advantage of the four-fold greater work capacity at a given rotation speed of counterrotating turbines as compared to the work capacity of a single rotation turbine. Because the differential velocity between adjacent blade rows determines the aerodynamic loading of the turbine elements, counterrotating turbines could be expected to greatly improve the turbine efficiency and decrease the number of required turbine blade rows or sets.

In accordance with the invention as embodied and broadly described herein, the fan jet engine has means for generating hot combustion gases, at least one set of fan blades for providing engine by-pass air and thrust, and counterrotating turbine means disposed to be driven by the hot combustion gases. The counterrotating turbine means includes first and second drum members, each with associated turbine blades, configured and mounted to counterrotate in opposite angular directions relative to one another. Reduction gear means are operatively connected to be driven by both of the first and second counterrotating drum members and includes output means operatively connected to drive the fan blades. Alternately, the fan jet engine can have at least two sets of fan blades, and the reduction gear output means is operatively connected to drive each fan blade set in an angular direction opposite the other fan blade set.

Preferably, high speed shaft means are used to operatively connect the reduction gear means to the counterrotating turbine means. The high speed shaft means includes at least two counterrotating shaft members each connected to be driven by a respective one of the first and second drum members.

It is also preferred that one or more turbine inlet guide vanes are positioned upstream of the counterrotating turbine means, and one or more turbine exit guide vanes are positioned downstream of the counterrotating turbine means relative to the flow of combustion gases, for cooperation therewith.

It is further preferred that the reduction gear means includes a pair of cooperating planetary gear assemblies, each of the assemblies having a rotatable sun gear, a ring gear, and a set of planetary gears disposed between the respective ring gear and sun gear. Each of the sun gears is operatively connected to be driven by a respective one of the two shaft members. For the engine construction having a single set of fan blades, the reduction gear means preferably can further include rotational direction reversal means interconnecting one of the sun gears with the respective set of planetary gears, and the reduction gear output means includes a rotatable planet gear carrier member carrying the planet gear sets from both of the planetary gear assemblies for transmitting power from each of the two shaft members to the fan. The rotational direction reversal means can include a set of pinion gears disposed to intermesh between the one sun gear and the respective set of planetary gears. The set of pinion gears is carried by the carrier member, and the ring gears are fixed relative to the engine frame.

For the engine construction having two or more counterrotating fan blade sets, it is preferred to have the common planetary gear carrier member fixed and both ring gears free to rotate in opposite directions. In this case, the reduction gear output means includes means for interconnecting the ring gears to drive respective ones of the counterrotating fan blade sets.

It is still further preferred that the combustion gas generating means include a core engine portion comprising a high pressure compressor, a combustor, and a turbine for driving the high pressure compressor and that the fan jet engine further includes a low pressure compressor stage positioned upstream of the high pressure compressor. Means operatively connected to one of the counterrotating shaft members are provided for directly driving the low pressure compressor.

BRIEF DESCRIPTION OF THE DRAWINGS

The accompanying drawing, which is incorporated in and constitutes a part of this specification, illustrates preferred embodiments of the invention and, together with the description, serves to explain the principles of the invention.

Of the drawing:

FIG. 4 is a schematic cross-sectional view of another embodiment of the present invention; and FIG. 5 is a detailed cross-sectional view of a component of the embodiment of FIG. 4.

Reference will now be made to the present preferred embodiments of the invention which are illustrated in the accompanying drawing.

DESCRIPTION OF THE PREFERRED EMBODIMENTS

Figure 1:
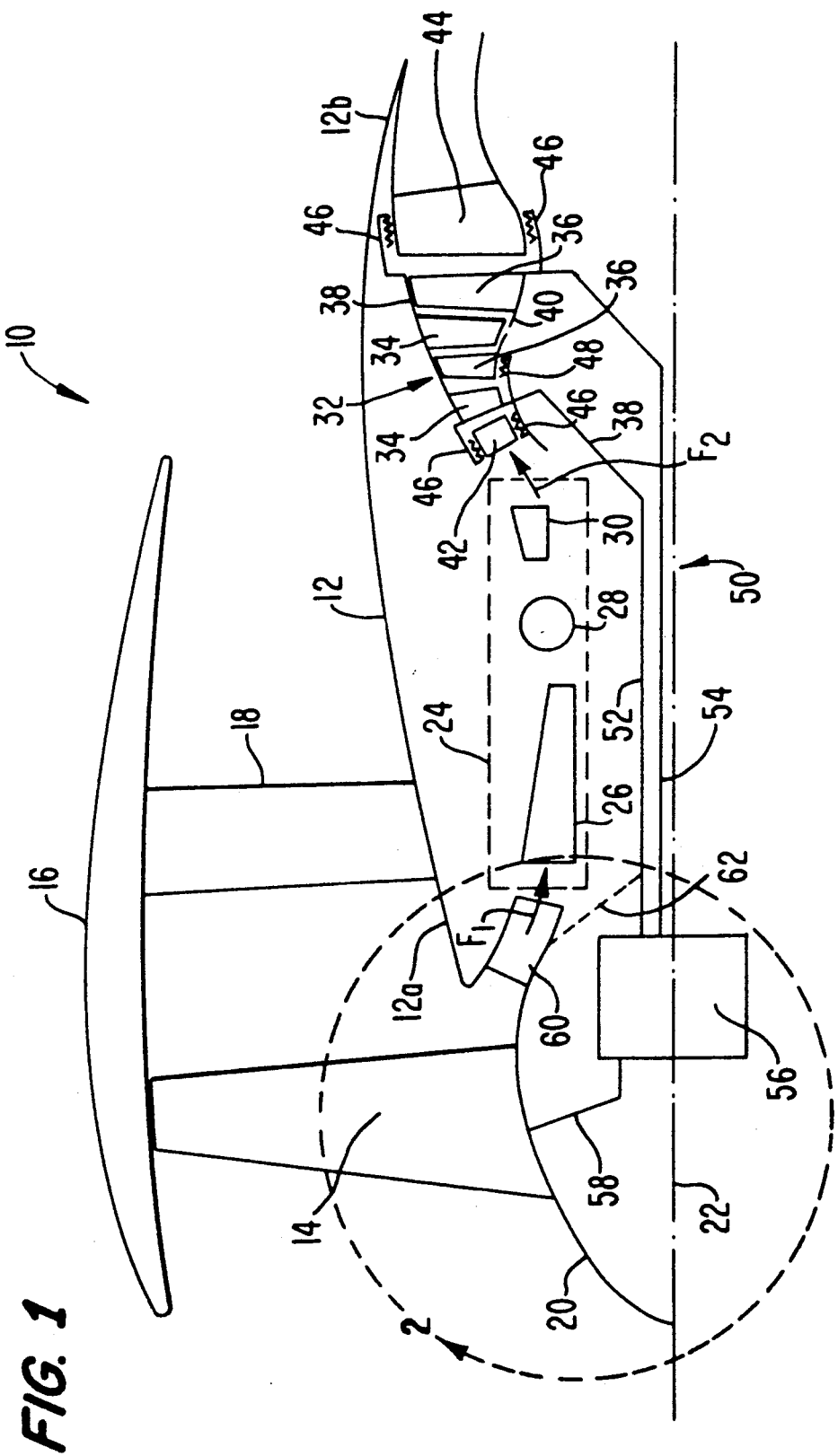
FIG. 1 is a schematic cross-sectional view of one embodiment of the present invention.

With initial reference to FIG. 1, there is shown an axial flow fan jet engine of the high by-pass type constructed in the accordance with the present invention, and designated generally by the numeral 10. The engine includes a generally axisymetric frame 12 having a leading portion 12a and an aft portion 12b, with respect to the intended direction of motion.

In accordance with the present invention, the fan jet engine includes fan means for producing by-pass air and thrust. As embodied herein, and as shown in FIG. 1, the fan means includes at least one set of rotatable fan blades 14 which are housed in a cyclindrical by-pass or fan duct 16 which is attached to frame 12 by struts 18. Struts 18 also serve as outlet guide vanes for fan blades 14, as is conventional. Fan blades 14 also can be unducted, in which case duct 16 and struts 18 would not be utilized and the general aerodynamic profile of the fan blades would change. Fan blades 14 are mounted on a hub 20 which rotates about engine axis 22 as depicted in the drawing.

Further in accordance with the present invention, means are provided for generating combustion gases. As embodied herein, housed within engine frame 12 is an engine core portion designated generally 24 which serves as the combustion gas generator means for engine 10. Core portion 24 includes high pressure compressor 26, combustion chamber 28 and high pressure turbine 30 for driving compressor 26, all depicted schematically in FIG. 1. Briefly, high pressure compressor 26 receives air from low pressure compressor or "booster" 60 (to be discussed in more detail hereinafter) along direction $F_1$ and provides compressed air to combustor 28 wherein it is mixed with fuel and the mixture combusted to provide high temperature combustion gases. Turbine 30 is positioned to extract work from the high temperature combustion gases in order to drive high pressure compressor 26 by means of a directly connected hollow shaft (not shown for clarity) in a manner that will be understood by those skilled in the art. The high temperature combustion gases thereupon exit engine core portion 24 in the direction designated $F_2$ for utilization by other components of fan jet engine 10, as will now be descried in detail.

Still further in accordance with the present invention, the fan jet engine further includes counterrotating turbine means mounted rearwardly of the engine core portion and disposed be driven by the high temperature combustion gases exiting the engine core portion. The counterrotating turbine means specifically includes at least first and second drum members, each with associated turbine blades affixed thereon, configured and mounted to rotate in opposite angular directions relative to one another. As embodied herein, and with continued reference to FIG. 1, counterrotating power turbine means designated generally by the numeral 32 includes a first or outer drum member 38 having two sets of radially inwardly directed turbine blades 34 and a second or inner drum member 40 having tow sets of radially outwardly extending turbine blades 36 spaced in the direction of axis 22. Blades 34 and 36 are arranged in interdigitated rows and are positioned to receive the high-temperature combustion gases exiting core engine portion 24 in the direction $F_2$. Only two rows each of blades 34 and 36 are shown in FIG. 1. More or fewer rows could be used. Blades 34 are configured and mounted to drive drum member 38 in one angular direction about axis 22 while blades 36 are configured and mounted to drive drum member 40 about axis 22 in the opposite angular direction. It is contemplated that the rotational speeds of drum members 38 and 40 can be the same or differ in absolute magnitude. However, one skilled in the art given the present disclosure together with the design specifications of the particular application could configure blades 34 and 36 to function to extract work from the combustion gas stream at any desired rotational speeds for the respective blades and drum members.

Preferably, one or more inlet guide vanes 42 can be provided to control the swirl upstream of blades 34, 36 and one or more outlet guide vanes 44 can be disposed downstream to provide flow straightening of the exiting combustion gases to reduce noise. Both inlet guide vanes 42 and outlet guide vanes 44 are fixed relative to frame 12. Also, appropriate seals such as stationary/rotating interface seals 46 and rotating/rotating interface seals 48 are provided to seal off potential leakage flow paths and to maintain the efficiency of the counter-rotating turbine.

Preferably, the fan jet engine includes high speed shaft means operatively connected to the counterrotating turbine means and extending axially to a position forward of the engine core portion. The high-speed shaft means specifically includes at least two counterrotating, concentric shaft members each connected to be driven by a respective one of the drum members and associated blades sets. As embodied herein and with continued reference to FIG. 1, shafts 52 and 54 are connected respectively to drum members 38 and 40 for dependent rotation therewith. Shafts 52 and 54 are concentric with engine axis 22 and extend from the position of the counter rotating turbine means 32 axially forward of core portion 24 for utilization by means to be discussed hereinafter. Shafts 52 and 54 transmit the power extracted from the high temperature combustion gases by the respective turbine blades, namely blades 34 and 36, and rotate at the same high speeds as the drum members 38 and 40. Therefore, shafts 52 and 54 can be light weight shafts contributing to overall engine efficiency.

Still further in accordance with the present invention, the fan jet engine includes reduction gear means operatively connected to be driven by both of the two drum members and including output means operatively connected to drive the engine fan means. As embodied herein and with continued reference to FIG. 1, reduction gear means designated generally 56 is positioned forward of engine core portion 24 and is operatively connected to be driven by both drum members 38 and 40 via shaft members 52 and 54, in a manner to be discussed in greater detail hence forth. Reduction gear means 56 further includes output shaft 58 connected to rotate fan blades 14 via hub 20.

Also depicted in FIG. 1 is a further preferred construction of the present invention in which fan jet engine 10 includes low pressure or booster compressor stage 60 which provides pre-compressed air to high pressure compressor 26 of core engine portion 24. In the preferred embodiment of the present invention, low pressure compressor rotor 62 (shown in dotted line and more clearly in FIG. 2) is connected to be directly driven from shaft member 52. Thus, a portion of the power transmitted from turbine blade set 34 via shaft 52 is transmited into the reduction gear means 56, and the remainder is used to power low pressure compressor 60.

Figure 2:
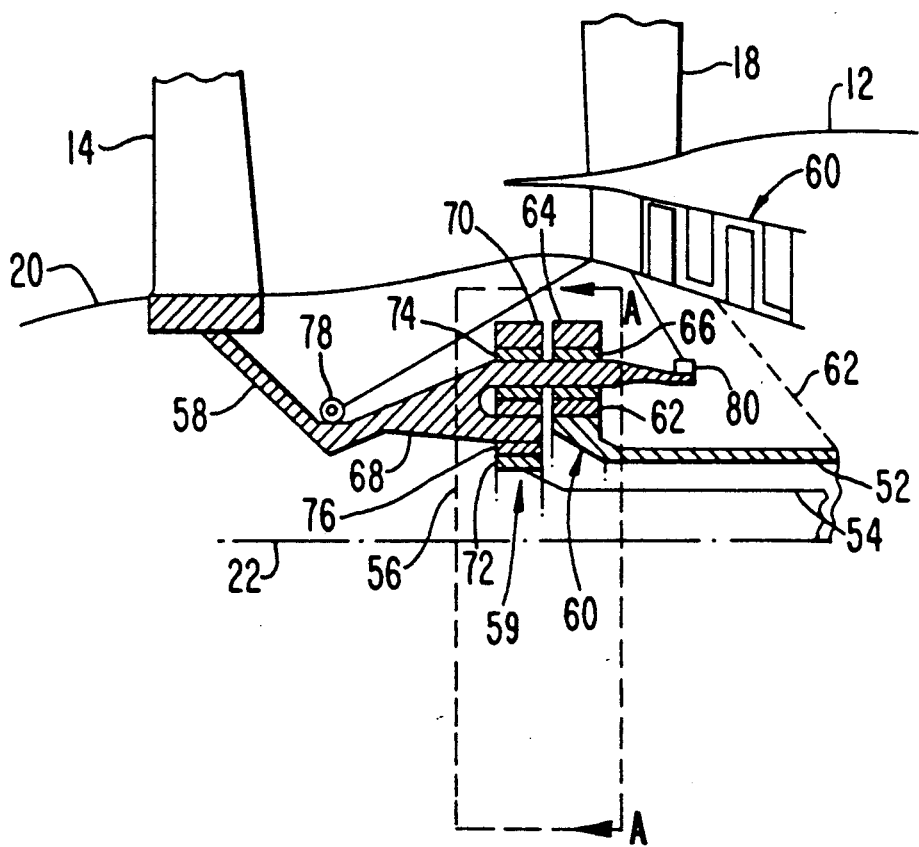
FIG. 2 is a detailed schematic of the area enclosed by the dotted circle in FIG. 1.
Figure 3:
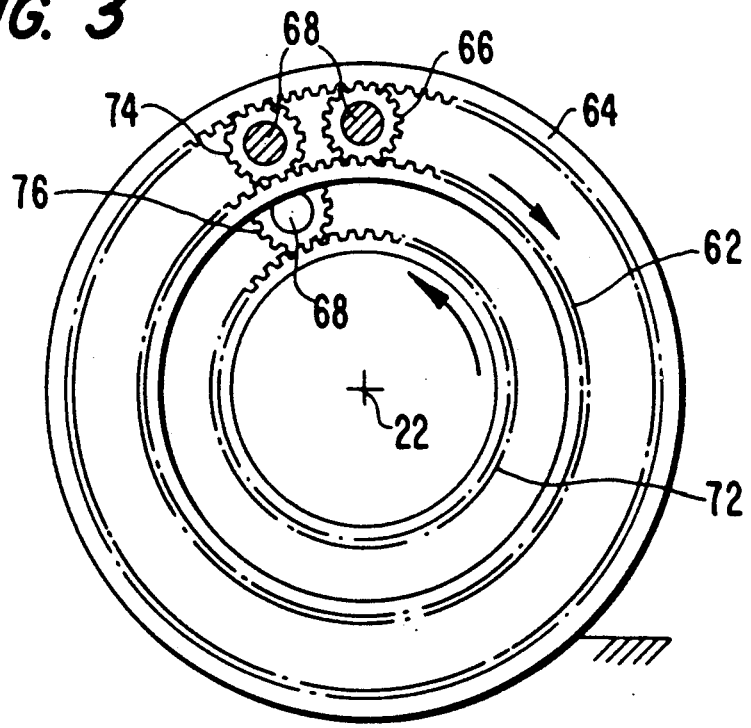
FIG. 3 is a partial view taken along the line A—A in FIG. 2.

FIGS. 2 and 3 show the presently preferred construction of reduction gear means 56. As embodied herein and with initial reference to FIG. 2, reduction gear means, 56 includes two cooperating planetary gear assemblies 59 and 60 which are mounted side-by-side and co-axially with engine axis 22. Each of planetary gear assemblies 58 and 60 has a respective ring gear, sun gear and set of planetary gears cooperating to produce differential speeds. Specifically, planetary gear assembly 60 includes sun gear 62 directly connected to shaft 52, and ring gear 64 fixed relative to engine frame 12. Disposed to intermesh between sun gear 62 and ring gear 64 are planetary gears 66 which are carried by common carrier member 68.

Planetary gear assembly 59 includes a ring gear 70 that is fixed relative to frame 12 and a sun gear 72 that is directly connected to shaft 54. However, planetary gears 74 are intermeshed with ring gear 70 but are not directly connected to sun gear 72. Rather, a set of pinion gears 76 is disposed between sun gear 72 and planetary gears 74 to provide angular direction reversal means for shaft 54 which is rotating in the opposite directional sense with respect to shaft 52.

FIG. 3 depicts reduction gear means 56 as viewed along the direction of axis 22. As shown in FIG. 3, sun gear 72 rotates with shaft 54 in a counter-clockwise direction as depicted, while sun gear 62, which is connected to rotated with shaft 52, moves in a clockwise direction. Pinion gears 76 are provided to change the angular direction of the force transmitted to the respective planetary gears 74 so as to be in the same rotational sense, namely clockwise, as the driving force imparted to planetary gears 66 via sun gear 62, for reasons that will become apparent from the succeeding discussion.

Importantly, both sets of planetary gears 66 and 74 are carried by the same carrier member, namely carrier member 68. Pinion gears 76 preferably are also carried by carrier 68. Because carrier member 68 rotates at a speed reduced with respect to the rotational speeds of both shaft members 52 and 54, in the absolute sense, carrier member 68 can be utilized to drive fan blade 14 via output shaft member 58 and hub 20. One skilled in the art given the present disclosure could select and configure appropriate components for reduction gear means 56, including the structural support members necessary for the rotating elements, such as bearing members 78 and 80 depicted schematically in FIG. 2.

FIG. 4 shows an alternative embodiment for the fan jet engine constructed in accordance with the present invention. Specifically, fan jet engine designated generally 110 has the corresponding elements of the fan engine embodiment shown in FIG. 1 except that two sets of fan blades are utilized, namely fan blades 114a and 114b, which blade sets are mounted on respective counterrotating hub members 120a and 120b. In this embodiment, reduction gear means 156 includes a pair of output shafts 158a and 158b connected respectively to hub numbers 120a and 120b. A number of different configurations of the reduction gear means could drive the respective fan blade sets 114a and 114b in opposite directions. For instance, and as depicted in FIG. 5, reduction gear means 156 can include a pair of planetary gear assemblies 158 and 160, with gear assembly 158 having ring gear 170, sun gear 172, and intermeshing planetary gears 174. Planetary gear assembly 160 includes respective ring gear 164, sun gear 162, and planetary gears 166. Both planetary gear sets 174 and 166 are carried by a common carrier, namely carrier 168.

As in reduction gear means 56 discussed in relation to the FIG. 1 embodiment, both sun gears 162 and 172 are connected to be driven by high speed shafts 152 and 154, respectively. However, ring gears 164 and 170 are not fixed relative to frame 112, but are allowed to rotate, while carrier 168 is fixed relative to frame 112. As high speed shafts 152 and 154 rotate in opposite directions, the attached sun gears 162 and 172 impart opposite sense rotation to the respective planetary gears 166 and 174 which, in turn, drive respective ring gears 164 and 170 in opposite directions. Output shafts 158a and 158b are connected to the rotatable ring gears 170 and 164, respectively, to provide the desired counterrotation of fan blades 114a and 114b. No direction-reversing gear means, such as pinion gears 76 in the FIG. 1 embodiment, are required for the reduction gear means 156 of the embodiment shown in FIG. 4. One skilled in the art, given the present disclosure, would realize that other reduction gear means could be used to achieve the desired result.

Moreover, it would be apparent to those skilled in the art that other modifications and variations can be made in the above-described embodiments of the present invention without departing from the scope or spirit of the invention. Thus, it is intended that the present invention covers such modifications and variations provided they come within the scope of the appended claims and their equivalents.

What is claimed is:

1. An axial flow fan jet engine comprising:
 at least one set of fan blades for providing by-pass air and thrust;
 a core portion for generating hot combustion gases, the core portion including a high pressure compressor for providing compressed air, a combustor for combusting the compressed air with fuel to produce the combustion gases, and a turbine for driving the high pressure compressor;
 counterrotating turbine means mounted rearwardly of the engine core portion and disposed to be driven by the hot combustion gases exiting said engine core portion, said counterrotating turbine means including at least one set of first turbine blades configured and mounted to rotate in one angular direction relative to the engine axis, and at least one set of second turbine blades positioned axially adjacent said first blade set and configured and mounted to rotate in the opposite angular direction;
 high speed shaft means operatively connected to said counterrotating turbine means and extending axially to a position forward of the engine core portion, said high speed shaft means including at least two counterrotating shaft members each connected to be driven by a respective one of said first blade set and said second blade set; and
 reduction gear means positioned forwardly of the core engine portion and operatively connected to be driven by both of said two shaft members, said reduction gear means including output means operatively connected to drive said fan blades at a rotational speed less than the rotational speed of either of said two shaft members;

wherein said reduction gear means includes a pair of cooperating planetary gear assemblies, each of said assemblies having a rotatable sun gear, a ring gear, and set of planetary gears disposed between the the respective ring gear and sun gear, each of said sun gears being operatively connected to be driven by a respective one of said two shaft members.

2. The axial flow fan jet engine as in claim 1 wherein said reduction gear means further includes rotational direction reversal means interconnecting one of said sun gears with the respective set of planetary gears, and wherein said reduction gear output means includes a rotatable planetary gear carrier member for carrying the planetary gear sets from both of said pair of planetary gear assemblies for transmitting power from each of said two shaft members to said fan blades.

3. The axial flow fan jet engine as in claim 2 wherein said rotational direction reversal means includes a set of pinion gears disposed to intermesh between said one sun gear and the respective set of planetary gears.

4. The axial flow fan jet engine as in claim 3 wherein said set of pinion gears is carried by said carrier member.

5. The axial flow fan jet engine as in claim 1 wherein both said ring gears are fixed relative to the engine frame.

6. The axial flow fan jet engine as in claim 1 wherein both of said ring gears are free to rotate relative to the engine frame; wherein said reduction gear means includes a planetary gear carrier member carrying the planetary gear sets from both of said pair of gear assemblies; and wherein said planetary gear carrier member is fixed relative to the engine frame, said ring gears being driven to counterrotate with respect to one/another.

7. The axial flow fan jet engine as in claim 6 wherein at least two sets of fan blades are provided, and wherein said reduction gear output means includes means for operatively connecting each of said ring gears to drive a respective one of said two fan blade sets, whereby said two fan blade sets counterrotate with respect to one another.

8. The axial flow fan jet engine as in claim 1 further including a low pressure compressor stage positioned upstream of said core portion high pressure compressor, and means operatively connected to one of said shaft members for directly driving said low pressure compressor.

9. The axial flow fan jet engine as in claim 6 further including a by-pass duct mounted to surround said set of fan blades.

* * * * *